United States Patent [19]
Doniger

[11] 3,881,670
[45] May 6, 1975

[54] CONTROL SYSTEM WITH DUAL UNMONITORED CONDITION SENSORS AND FAIL OPERATIVE CHARACTERISTICS

[75] Inventor: Jerry Doniger, Montvale, N.J.

[73] Assignee: The Bendix Corporation, Teterboro, N.J.

[22] Filed: Dec. 7, 1973

[21] Appl. No.: 422,824

[52] U.S. Cl. ......... 244/77 M; 235/153 AE; 318/565
[51] Int. Cl. .......................................... B64c 13/50
[58] Field of Search............ 244/77 M; 235/153 AE; 318/564, 565; 307/204, 219

[56] References Cited
UNITED STATES PATENTS

| | | |
|---|---|---|
| 3,551,776 | 12/1970 | Tawfik et al. ................. 244/77 M X |
| 3,667,057 | 5/1972 | Pfersch et al. ............. 235/153 AE X |
| 3,805,235 | 4/1974 | Foster et al. ................. 244/77 M X |

*Primary Examiner*—Trygve M. Blix
*Assistant Examiner*—Barry L. Kelmachter
*Attorney, Agent, or Firm*—Anthony F. Cuoco; S. H. Hartz

[57] ABSTRACT

A fail operative control system equipped with dual unmonitored condition sensors which would otherwise render the system fail passive or fail safe. The fail operative feature is achieved in response to signals from the unmonitored sensors and a signal from another sensor, and which signal is essentially the first derivative of the signals from the unmonitored sensors.

5 Claims, 2 Drawing Figures

CONTROL SYSTEM WITH DUAL UNMONITORED CONDITION SENSORS AND FAIL OPERATIVE CHARACTERISTICS

BACKGROUND OF THE INVENTION

1. Field of the Invention

This invention relates generally to control systems and particularly to means for providing fail operational performance for control systems equipped with dual unmonitored condition sensors. More particularly, this invention relates to control systems of the type described which are rendered fail operational without providing self-monitored condition sensors or an additional control channel.

2. Description of the Prior Art

Control systems such as may be used for controlling the flight of an aircraft and which are provided with dual unmonitored condition sensors normally have fail passive or fail safe characteristics. In order to render these systems fail operative, such as may be required for automatic landing of the aircraft under all weather conditions, the expensive addition of a third channel or replacement of the unmonitored sensors by self-monitored devices has heretofore been required. The equipment herein described uses the unmonitored sensors in conjunction with a sensor that provides signals corresponding to the first derivative of the signals from the unmonitored sensors to accomplish the fail operative characteristic. Modern flight control systems normally include such first derivative or rate sensors so that additional on-board equipment is not required. These sensors may include apparatus for providing yaw rate signals relative to heading data, normal acceleration signals relative to vertical speed data and vertical speed signals relative to vertical displacement data, with the aforenoted derivative signals being available for control as described in the present invention.

SUMMARY OF THE INVENTION

This invention contemplates apparatus whereby condition signals from a pair of dual unmonitored condition sensors included in redundant control channels and a signal corresponding to the first derivative or rate of the condition signals are applied to a voter/monitor which provides an output signal as the average of the "good" input signals. Under conditions wherein either of the condition signals or the rate signal differs by a predetermined amount from the voter output, that signal is inhibited from driving the voter. The subsequent voter output signal is the average of the two remaining "good" signals and the system driven by the voter continues to operate normally, i.e., the system is fail operative. A subsequent failure of one of the two remaining signals is likewise detected. Appropriate logic may provide a failure display and disengage the control system upon a double failure.

The main object of this invention is to render a control system having dual unmonitored condition sensors fail operative without the addition of a third control channel or the replacement of the unmonitored sensors by self monitored devices.

Another object of this invention is to achieve the fail operative characteristic by using signals from the dual unmonitored sensors in conjunction with a signal corresponding to the first derivative of the signals from said sensors.

Another object of this invention is to achieve the above by using a voter/monitor for providing an output signal in response to the input condition signals and rate signal, and which voter monitor is driven only by the good input signals.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
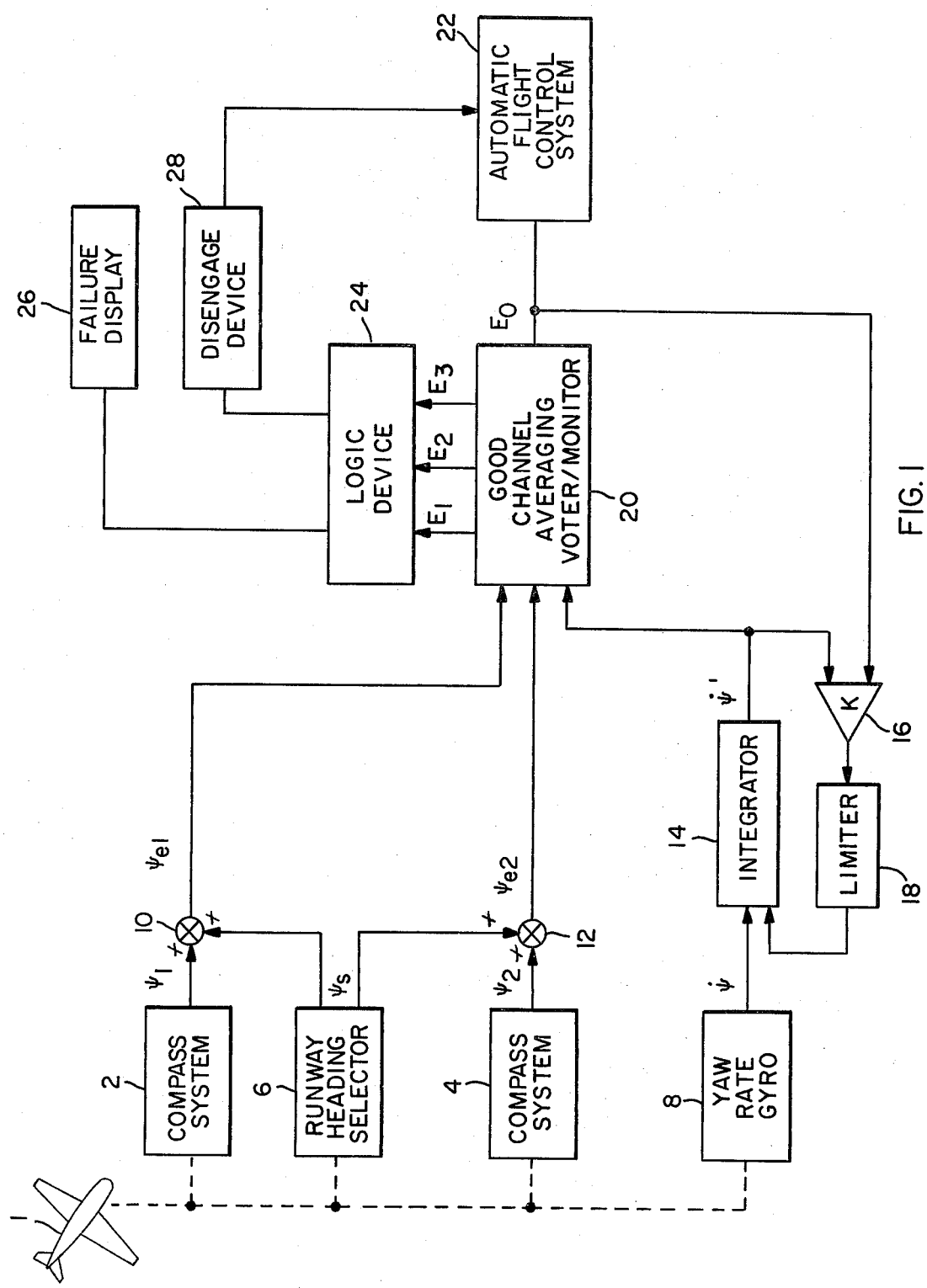
FIG. 1 is a block diagram showing a system according to the invention for controlling the heading of an aircraft.

With reference first ot FIG. 1, a compass system 2 and a compass system 4 provide redundant signals $\psi_1$ and $\psi_2$, respectively, corresponding to the heading of an aircraft 1 and pilot-operated heading selector 6 provides a signal $\psi_s$ corresponding to the heading of a runway at which it is desired to land aircraft 1. A yaw rate gyro 8 provides a signal $\dot{\psi}$ corresponding to the yaw rate of aircraft 1. Compass systems 2 and 4, heading selector 6 and yaw rate gyro 8 are conventional devices well known in the art such as may be included in modern automatic flight control systems.

Signal $\psi_1$, from compass system 2 and signal $\psi_s$ from runway selector 6 are applied to a summing means 10 which sums the signals and provides an error signal $\psi_{e1}$. Signal $\psi_2$ from compass system 4 and $\psi_s$ from runway heading selector 6 are applied to a summing means 12 which sums the signals and provides an error signal $\psi_{e2}$.

Signal $\dot{\psi}$ from yaw rate gyro 8 is applied to an integrator 14. Integrator 14 has a feedback loop connected thereto and including a difference amplifier 16 with a gain K and a limiter 18 for limiting the amplified signal. Integrator 14 provides a signal $\dot{\psi}'$.

Signal $\psi_{e1}$ from summing means 10, signal $\psi_{e2}$ from summing means 12 and signal $\dot{\psi}'$ from integrator 14 are applied to a good channel averaging voter/monitor designated by the numeral 20. Voter/monitor 20 is a device such as described in U.S. Pat. No. 3,667,057 issued May 20, 1972 to George H. Pfersch, Jr. and Jerry Doniger and assigned to The Bendix Corporation, assignee of the present invention. In general, the voter/monitor includes circuitry having averaging means for providing an output signal $E_0$ corresponding to the average of input signals $\psi_{e1}$, $\psi_{e2}$, $\dot{\psi}'$. Comparators are included in the voter/monitor for comparing each input signal to the average output and switching means are controlled by the comparators for eliminating unacceptable input signals from the average when the signals differ by a predetermined amount from the monitor output. Signal $E_0$ from voter/monitor 20, and which voter/monitor will be further described with reference to FIG. 2, drives an automatic flight control system 22 which may be a conventional flight director or a servo driven autopilot. Monitor 20 further provides signals $E_1$, $E_2$ and $E_3$ which are applied to a logic device 24, and which logic device drives a failure display means 26 for displaying a single failure and drives a disengage device 28 which disengages automatic flight control system 22 after a double failure. Output signal $E_0$ and signals $E_1$, $E_2$ and $E_3$ are provided by voter/monitor 20 as will be next described with reference to FIG. 2.

Figure 2:
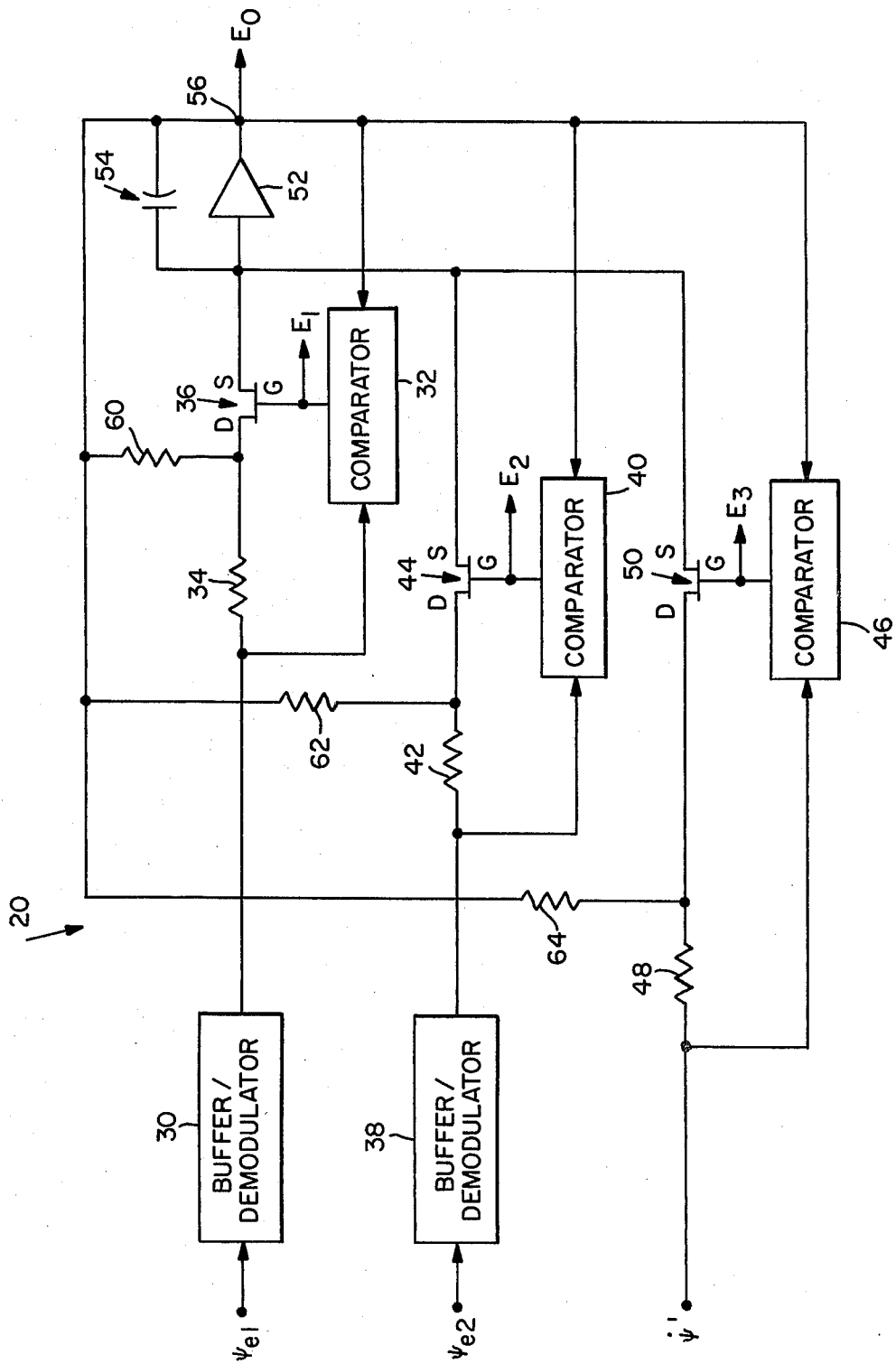
FIG. 2 is a block diagram of voter/monitor 20 which is shown generally in FIG. 1.

With reference now to FIG. 2 voter/monitor 20 includes comparators 32, 40 and 46, and field effect transistors 36, 44 and 50. Signal $\psi_{e1}$ from summing means 10 (FIG. 1) is applied through a buffer/demodulator 30 to comparator 32, and through a resistor 34 to the drain element (D) of field effect transistor 36.

Signal $\psi_{e2}$ from summing means 12 (FIG.1) is applied through buffer/demodulator 38 to comparator 40, and through a resistor 42 to the drain element (D) of field effect transistor 44.

Signal $\psi'$ from integrator 14 is applied to a comparator 46, and through a resistor 48 to the drain element (D) of field effect transistor 50.

The source elements (s) of transistors 36, 44 and 50 are connected to an amplifier 52 having a capacitor 54 connected in feedback relation thereto. Amplifier 52 provides voter/monitor output $E_0$ at an output terminal 56.

A resistor 60 is connected intermediate resistor 34 and the drain element of transistor 36, a resistor 62 is connected intermediate resistor 42 and the drain element of transistor 44 and a resistor 64 is connected intermediate resistor 48 and the drain element of transistor 50. Resistors 60, 62 and 64 are connected in parallel relation to output terminal 56 of amplifier 52.

Comparator 32 compares signal $E_0$ with signal $\psi_{e1}$ applied through buffer/demodulator 30, and provides signal $E_1$ when the compared signals differ by a predetermined amount. Signal $E_1$ controls the gate element (G) of transistor 36 to block passage of buffered/demodulated signal $\psi_{e1}$ to amplifier 52. Comparator 40 compares signal $E_0$ with signal $\psi_{e2}$ applied through buffer/demodulator 38, and provides signal $E_2$ when the compared signals differ by a predetermined amount. Signal $E_2$ controls the gate element (G) of transistor 44 to block passage of buffered/demodulated signal $\psi_{e2}$ to amplifier 52. Comparator 46 compares signal $E_0$ with signal $\psi'$ and provides signal $E_3$ when the compared signals differ by a predetermined amount. Signal $E_3$ controls the gate element (G) of transistor 50 to block passage of signal $\psi'$ to amplifier 52.

OPERATION OF THE INVENTION

Error signals $\psi_{e1}$ and $\psi_{e2}$ are applied through buffer demodulators 30 and 38, respectively, so that subsequent single processing is performed on a d.c. basis. In this connection it is noted that the d.c. signal format is not important to the proper operation of the system, said system operating equally as well in response to a.c. signals.

Signals $\psi_{e1}$ and $\psi_{e2}$, together with signal $\psi'$ are applied as input signals to voter/monitor 20 which provides output signal $E_0$ as the average of the properly operating input signals. Under conditions wherein either signal $\psi_{e1}$, $\psi_{e2}$ or $\psi'$ differs by a predetermined amount from the average output signal of the voter/monitor as determined by the associated comparators 32, 40 and 46, respectively, that input signal is inhibited from driving the voter/monitor. The subsequent output signal $E_0$ is the average of the two remaining good input signals and automatic flight control system 22 is driven by signal $E_0$ so as to operate normally. A subsequent failure of one of the two remaining input signals is likewise detected. Logic device 24 is responsive to signals $E_1$, $E_2$, and $E_3$ provided by comparator 32, 40 and 46, respectively, to provide appropriate failure display logic and to automatically disengage the automatic flight control system upon a double failure.

Each of the comparators 32, 40 and 46 in voter/monitor 20, as shown in FIG. 2, compares the output of the voter/monitor with its associated input signals $\psi_{e1}$, $\psi_{e2}$ and $\psi'$, respectively. The comparators normally provide a.c. outputs. The a.c. outputs of the comparators pulse width modulate each associated input signal through the cyclic operation of field effect transistors 36, 44 and 50, respectively. Under fault conditions the normal on-off toggling of the transistors is inhibited since each comparator, when its input signal exceeds the predetermined amount, results in the absence of an a.c. output. In these cases the input signal and its feedback path are removed from subsequent operation of the voter. The remaining two input signals are properly averaged since their feedback paths are operative.

Signal $\psi'$ from integrator 14 (FIG. 1) is used as a pseudo-heading reference. Under steady state conditions, when the aircraft heading is stabilized at some value that is generally related to a crosswind component that exists during final approach to the runway, the integrator is slowly driven through the feedback loop including amplifier 16, which provides a signal corresponding to the difference between signal $\psi'$ and signal $E_0$, and limiter 18, which limits the difference signal, to force its output to follow the average heading signal represented by output $E_0$ of voter/monitor 20. This long term slaving rate is limited by limiter 18 to improve the failure detection capabilities of the voter/monitor and to present significant response to failures in either of the two primary input signals $\psi_{e1}$ or $\psi_{e2}$. Integrator output $\psi'$ is a wide band replica of the average heading signal. Under steady state conditions the integrator does not drift and any error in signal $\psi'$ is limited as a function of the gain of the feedback loop and the value of the effective yaw rate/integrator null offset signal levels.

It will now be understood that the aforenoted objects of the invention have been met. Apparatus is provided for providing fail operative performance for control systems having dual unmonitored input signal sensors. Fail operative characteristics are provided without the expense of additional systems or replacement of the unmonitored sensors by self monitoring devices.

Although but a single embodiment of the invention has been illustrated and described in detail, it is to be expressly understood that the invention is not limited thereto. For example, although the invention has been described with reference to the heading of an aircraft, the described device will work equally as well with other flight parameters. Various changes may also be made in the design and arrangement of the parts without departing from the spirit and scope of the invention as the same will now be understood by those skilled in the art.

What is claimed is:
1. A fail operative control system, comprising:
   means for providing a first signal corresponding to a condition;
   means for providing a second redundant signal corresponding to the condition;

means for providing a reference signal;

means for combining the first signal and the reference signal and for providing a first error signal;

means for combining the second signal and the reference signal and for providing a second error signal;

means for providing a signal corresponding to the rate of change of the condition;

averaging means connected to both of said combining means and to the condition rate signal means and responsive to the first and second error signals and the rate signal for providing an output signal corresponding to the average of the acceptable error and rate signals and for eliminating those of said signals which differ from the average by a predetermined amount;

integrating means connected to the means for providing a signal corresponding to the rate of change of the condition for integrating the signal therefrom and for providing a signal as a pseudo-condition reference;

averaging means connected to both of said combining means and to the integrating means and responsive to the first and second error signals and the pseudo-condition reference signal for providing the output signal corresponding to the average of the acceptable error and pseudo-condition reference signals and for eliminating those of said signals which differ from the average by a predetermined amount and means connected to the last mentioned means and responsive to the output signal therefrom for controlling the condition.

2. A system as described by claim 1, including:

the averaging means having a first comparator for comparing the first error signal to the output signal and for providing a first output when said signals differ by a predetermined amount, a second comparator for comparing the second error signal to the output signal and for providing a second output when said signals differ by a predetermined amount, and a third comparator for comparing the pseudo-condition reference signal to the output signal and for providing a third output when said signals differ by a predetermined amount; and means connected to the averaging means and responsive to the first, second and third outputs from the first, second and third comparators, for displaying unacceptable error and pseudo-condition reference signal conditions.

3. A system as described by claim 1, including:

the averaging means having a first comparator for comparing the first error signal to the output signal and for providing a first output when said signals differ by a predetermined amount, a second comparator for comparing the second error signal to the output signal and for providing a second output when said signals differ by a predetermined amount, and a third comparator for comparing the pseudo-condition reference signal to the output signal and for providing a third output when said signals differ by a predetermined amount; and means connected to the averaging means and to the condition controlling means and responsive to the first, second and third outputs from the first, second and third comparators for disengaging the controlling means when said outputs are commensurate with a predetermined unacceptable error and pseudo-condition reference signal condition.

4. A system as described by claim 1, including:

feedback means connected to the integrating means; and the feedback means connected to the averaging means and applying the output signal therefrom to the integrating means for driving the integrating means so that the pseudo-condition reference signal from the integrating means follows the averaging means output signal.

5. A system as described by claim 4, wherein the feedback means includes:

a difference amplifier connected to the integrating means and to the averaging means for providing a signal corresponding to the difference between the pseudo-condition reference and averaging means output signals; and a limiter connected to the difference amplifier and to the integrating means for limiting the difference signal and for applying said limited signal to the integrating means.

* * * * *